United States Patent
Jerrard-Dunne (10) Patent No.: US 11,206,249 B2
(45) Date of Patent: Dec. 21, 2021

(54) ENTERPRISE WORKSPACES

(71) Applicant: INTERNATIONAL BUSINESS MACHINES CORPORATION, Armonk, NY (US)

(72) Inventor: Stanley Kieran Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/523,152

(22) Filed: Jul. 26, 2019

(65) Prior Publication Data
US 2021/0029098 A1 Jan. 28, 2021

(51) Int. Cl.
*H04L 29/06* (2006.01)

(52) U.S. Cl.
CPC .......... *H04L 63/08* (2013.01); *H04L 63/1416* (2013.01)

(58) Field of Classification Search
CPC .... H04L 63/08; H04L 63/1416; H04L 63/102
See application file for complete search history.

(56) References Cited

U.S. PATENT DOCUMENTS

| | | | |
|---|---|---|---|
| 6,324,683 B1 | 11/2001 | Fuh | |
| 8,271,418 B2 * | 9/2012 | Allen | G06F 21/577 706/47 |
| 8,489,880 B1 | 7/2013 | Gagnon | |
| 8,841,987 B1 | 9/2014 | Stanfield | |
| 9,569,596 B2 | 2/2017 | Marcus | |
| 9,900,300 B1 * | 2/2018 | Bennett | G06F 21/44 |
| 10,037,199 B2 | 7/2018 | Hung | |
| 10,073,679 B2 | 9/2018 | Straub | |
| 10,089,810 B1 | 10/2018 | Kaye | |
| 10,242,232 B1 * | 3/2019 | Hurry | G06F 21/6281 |
| 2003/0189530 A1 | 10/2003 | Tsui | |
| 2003/0193448 A1 | 10/2003 | Tsui | |
| 2004/0117489 A1 * | 6/2004 | Harmon | H04L 63/101 709/229 |
| 2005/0026601 A1 | 2/2005 | Chuey | |
| 2005/0216397 A1 * | 9/2005 | Micci-Barreca | G06Q 20/4016 705/39 |
| 2006/0098585 A1 * | 5/2006 | Singh | H04L 63/1416 370/252 |

(Continued)

FOREIGN PATENT DOCUMENTS

WO 2007039873 A2 4/2007

OTHER PUBLICATIONS

IBM, List of IBM Patents or Patent Applications Treated as Related, Appendix P, dated Jul. 27, 2019, 2 pages.

(Continued)

*Primary Examiner* — Aravind K Moorthy
(74) *Attorney, Agent, or Firm* — Kristofer L. Haggerty (57) ABSTRACT

Concepts for defining and processing an expression of an enterprise workspace application are presents. Such concepts may associate an expression of an enterprise workspace application with a modified version of the expression and a state flag which is configured to define whether processing of at least part of the expression is to be based on (i.e. employ) the modified version of the expression. In this way, there may be provided concepts for protecting against malicious users setting triggers or overriding function definitions that cause other users to perform unexpected activities.

17 Claims, 6 Drawing Sheets

(56) References Cited

U.S. PATENT DOCUMENTS

| | | | | |
|---|---|---|---|---|
| 2006/0107253 | A1* | 5/2006 | Sano | G06F 8/10 717/123 |
| 2006/0206931 | A1 | 9/2006 | Dillaway | |
| 2007/0046424 | A1 | 3/2007 | Davis | |
| 2007/0283396 | A1 | 12/2007 | Kiujlaars | |
| 2008/0155095 | A1* | 6/2008 | Yamaguchi | H04L 63/0876 709/224 |
| 2008/0195740 | A1* | 8/2008 | Lowell | H04L 67/142 709/229 |
| 2009/0128392 | A1 | 5/2009 | Hardacker | |
| 2011/0228936 | A1 | 9/2011 | Silvermint | |
| 2012/0150843 | A1* | 6/2012 | Robert | G06F 21/41 707/722 |
| 2012/0151211 | A1* | 6/2012 | Kreiner | G06F 21/53 713/168 |
| 2013/0346475 | A1* | 12/2013 | Jasperson | G06F 16/95 709/203 |
| 2014/0136606 | A1 | 5/2014 | Roundtree | |
| 2014/0218165 | A1 | 8/2014 | Johnson | |
| 2015/0012970 | A1* | 1/2015 | Toksvig | H04L 63/0815 726/3 |
| 2015/0058960 | A1 | 2/2015 | Schmoyer | |
| 2015/0371467 | A1 | 12/2015 | Wang | |
| 2015/0379554 | A1 | 12/2015 | Copeland | |
| 2016/0094572 | A1* | 3/2016 | Tyagi | G06F 8/427 726/23 |
| 2016/0112419 | A1* | 4/2016 | Cai | H04L 63/0815 726/6 |
| 2016/0145902 | A1 | 5/2016 | Kalous | |
| 2016/0274864 | A1* | 9/2016 | Zomet | G06F 16/957 |
| 2016/0283740 | A1 | 9/2016 | Roundtree | |
| 2016/0342504 | A1 | 11/2016 | Beskrovny | |
| 2016/0381032 | A1* | 12/2016 | Hashmi | H04L 63/102 726/4 |
| 2017/0019376 | A1 | 1/2017 | Hars | |
| 2017/0093872 | A1* | 3/2017 | Braksator | H04L 63/20 |
| 2017/0264612 | A1 | 9/2017 | Kaushal | |
| 2017/0289128 | A1 | 10/2017 | Kelley | |
| 2017/0364330 | A1 | 12/2017 | Cheung | |
| 2018/0060890 | A1* | 3/2018 | Noter | G06Q 10/06393 |
| 2018/0181608 | A1* | 6/2018 | Wu | G06F 16/2423 |
| 2018/0211462 | A1 | 7/2018 | Wendling | |
| 2018/0248896 | A1* | 8/2018 | Challita | G06F 21/6218 |
| 2019/0051067 | A1 | 2/2019 | Witkowski | |
| 2019/0149540 | A1* | 5/2019 | Shimazu | H04W 12/69 726/4 |
| 2019/0280943 | A1* | 9/2019 | Kaw | H04L 67/34 |
| 2019/0303614 | A1* | 10/2019 | Do | G06F 3/065 |
| 2019/0319954 | A1* | 10/2019 | Chimakurthi | G06F 16/164 |
| 2019/0342702 | A1 | 11/2019 | Shinar | |
| 2020/0137073 | A1 | 4/2020 | Palan | |
| 2020/0177577 | A1 | 6/2020 | Jerrard-Dunne | |
| 2020/0177598 | A1* | 6/2020 | Storr | G06F 21/45 |
| 2020/0184957 | A1* | 6/2020 | Asumu | G06N 7/005 |
| 2020/0244673 | A1* | 7/2020 | Stockdale | H04L 43/045 |
| 2021/0067532 | A1* | 3/2021 | Bruno | G06Q 10/0635 |

OTHER PUBLICATIONS

Pending U.S. Appl. No. 16/523,169, filed Jul. 26, 2019, entitled: "Enterprise Workspaces".

Pending U.S. Appl. No. 16/523,197, filed Jul. 26, 2019, entitled: "Enterprise Workspaces".

\* cited by examiner

ENTERPRISE WORKSPACES

BACKGROUND

The present invention relates generally to the field of enterprise workspaces, and more particularly to a method for defining processing of an expression of an enterprise workspace application.

The present invention also relates to a method of processing an expression of an enterprise workspace application.

The present invention also relates to a computer program product comprising computer-readable program code that enables a processor of a system, or a number of processors of a network, to implement such methods.

The present invention also relates to a system for processing an expression of an enterprise workspace application.

It is known to provide an enterprise workspace in computing devices/networks, so that an operating system can separate components and data in the enterprise workspace from components and data in a personal workspace. In addition, components can monitor, control, and restrict activity in the enterprise workspace without having to monitor, control, or restrict activity in the personal workspace. For such reasons, enterprise workspaces are commonly provided by companies for use by employees. For example, an employee can use his/her personal computing device to access an enterprise workspace provided by his/her employer and undertake work activities, whilst the enterprise workspace monitors, controls, and/or restricts activity in the enterprise workspace (so as to maintain security for example).

An enterprise workspace will typically require a user to create a user account with the distributor of the enterprise workspace. In this way, a user will typically have an enterprise workspace account associating the user with the enterprise workspace. The enterprise workspace account may, for example, be used to configure the enterprise workspace for the associated user.

Network service platforms are designed to allow people to access and/or share information through the internet. Nowadays, many network service platforms that provide services (e.g. applications and programs) have been developed. However, conventional services of network service platforms typically require a user to firstly complete a registration process before logging into the network service. After the registration process is completed, the user will have an associated service user account that he/she uses to log into the service (e.g. to acquire or use the services and functions provided by service platforms).

Enterprise workspace applications which intercept activity within a workspace are known, and such applications typically use a well-known webhook mechanism. Such webhook mechanisms are well-known with network service platforms, and thus enable an enterprise workspace application to work with a service of a network service platform.

Messages arrive via the webhook from a multitude of spaces and a multitude of users. An enterprise workspace application acts upon messages via user-defined triggers and functions (provided in the form of expressions). By way of example, trigger may be defined within a space as follows:

= function help() "You requested help"

= trigger helptrigger contains(message, "help") !!! say ("Hello", help())

Any message expressed into the space that has the above trigger containing the word "help" would then meet the trigger condition "contains(message, "help")" and thus activate the trigger function (in this case simply displaying the message "Hello You requested help").

A drawback of is that malicious users may set triggers or overriding function definitions that cause other users to perform unexpected activity.

SUMMARY

The present invention seeks to provide a computer-implemented method for defining processing of an expression of an enterprise workspace application.

The present invention also seeks to provide a computer-implemented method of processing an expression of an enterprise workspace application.

The present invention further seeks to provide a computer program product including computer program code for implementing a proposed method when executed by a processing unit.

The present invention also seeks to provide a processing system adapted to execute this computer program code.

The present invention also seeks to provide a system for processing an expression of an enterprise workspace application.

According to an aspect of the invention, there is provided a computer-implemented method for defining processing of an expression of an enterprise workspace application. The method comprises associating the expression with: a state flag; and a modified version of the expression. The state flag is configured to define whether processing of at least part of the expression is to be based on the modified version of the expression.

According to another aspect of the invention, there is provided a computer program product. The computer program product comprises a computer readable storage medium having program instructions embodied therewith, the program instructions executable by a processing unit to cause the processing unit to perform a method according to a proposed embodiment.

According to another aspect of the invention, there is provided a computer system comprising at least one processor and the computer program product according to an embodiment. The at least one processor is adapted to execute the computer program code of said computer program product.

According to another aspect of the invention, there is provided a system for processing an expression of an enterprise workspace application, the expression being associated with a state flag and a modified version of the expression. The system comprises an analysis component configured to determine a value of the state flag. The system also comprises a processing component configured to process either the expression or the modified version of the expression based on the determined value of the state flag.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are concepts for protecting against malicious users setting triggers or overriding function definitions that cause other users to perform unexpected activities.

Such concepts may associate an expression of an enterprise workspace application with a modified version of the expression and a state flag which is configured to define whether processing of at least part of the expression is to be based on (i.e. employ) the modified version of the expression. In this way, the state flag must be set to a predetermined value (e.g. true) in order for the modified version of the expression to be used.

The expression may be associated with an owner comprising an identifier of a first user account of the enterprise workspace, wherein the first user account has an associated service authorization configured to authorize the enterprise workspace application to access a service using the user account. This may therefore enable processing of the expression to be controlled, such that a value of the state flag controls whether or not the expression uses a user's authorization(s) (e.g. the service authorization associated with the first user account).

Proposed embodiments may thus provide a method and/or system for defining how an expression is to be processed. Proposed embodiments may also provide a method and/or system for processing such an expression. Such defining and/or processing may be implemented in a secure and flexible manner.

Embodiments may therefore provide a tool for associating an expression of an enterprise workspace application with a modified version of the expression, thus enabling either the expression or the associated modified version to be used (e.g. depending on an associated flag value).

For the avoidance of doubt, reference to an enterprise workspace is to be taken to refer to a workspace provided (by a distributor, controller, organization, etc.) in computing devices/networks which may have components and data that are separated from components and data of another (e.g. personal) workspace. Enterprise workspaces are commonly provided by companies for use by employees so that the employees can use their personal computing device(s) to access the enterprise workspace and undertake work activities. An example of such a workspace may, for instance, comprise a Slack™ channel accessed via a Slack™ client.

Also, reference to a service is to be taken to refer to a service provided by a service network platform and accessible via the Internet. A service network platform may, for example, be provided by an external, third party that is independent or different from the provider of the enterprise workspace. Services are commonly designed and provided so as to enable users to access and/or share information through the internet, and they typically require a user to register with the service so as to establish a service user account (having an associated identity) with one more corresponding service configurations and authorizations. An exemplary service may, for instance, provide an email service provider by a third party organization. Another example may be a Google® Application Programming Interface which may for example be used to enable a user to send email directly from a workspace.

Further, reference to an expression is to be taken to refer to a string of alphanumeric characters used to define a trigger or function for processing by an enterprise workspace application. Such a trigger or function which may comprise one or more messages obtained via a webhook function for example.

Embodiments may associate the expression with an owner. The owner may be provided with the unique identifier of a first user account of the enterprise workspace, the first user account having an associated service authorization configured to authorize the enterprise workspace application to access a service using the user account. In this way, the state flag may be used to control whether processing of the expression (or a part of the expression, i.e. subexpression) employees the service authorization (i.e. the authorizations of the first user account).

Although in some embodiments, the service authorization (allowing access to data of the service for the first user account) may have already been established (e.g. via a previously undertaken authorization process), some embodiments may further comprise the step of establishing a service authorization for the first user account. Accordingly, some embodiments may be configured to facilitate both a service authorization process and a process of controlling use of the service authorization when processing an expression.

By way of example, establishing a service authorization for the first user account may comprise: defining an oauth profile for the first user account; and, based on the oauth profile, defining a service authorization that is configured to authorize the enterprise workspace to access the service using the first user account. In this way, embodiments may support known authorization concepts and procedures, thus facilitating usage with existing/conventional services and service network platforms.

In some embodiments, a value of the state flag may be set by calling a predetermined function. For example, a state flag may be set to true by calling an "asme( )" function, and set to false by calling a "nasme( )" function. This may enable a user to easily control how the expression is processed.

Some embodiments may further comprise associating the expression with a trusted user. The trusted user may, for example, be defined based on an indication (e.g. input signal) provided by the owner, and the trusted user may comprise an identifier of a second user account of the enterprise workspace (which is different from the first user account). This may enable an owner of the expression to declare trust in second, other user. In this way, where an owner has declared such trust in another user, the expression will be configured to be processed (e.g. execute) with the identity of the owner. The owner can thus delegate expression processing (e.g. triggering of the expression) to one or more other users that are trusted (i.e. permitted to act on behalf of the owner). Untrusted users (i.e. users that have not been associated with the expression) may then be prevented from causing the expression to be processed as if it was by the owner.

Also, some embodiments may further comprise associating the expression with a trust flag, wherein the trust flag is configured to define whether processing of the modified version of the expression is permitted or not permitted. A value of the trust flag may, for example, be set based on an indication provided by the owner. This can enable an expression to be defined as trusted or not. In this way, where another user has provided the expression, the expression may be identified as trusted or untrusted. Untrusted expressions (i.e. expressions that have not been identified as trusted) may then be prevented from being processed.

Embodiments may also provide a method of processing an expression of an enterprise workspace application. Such a method may include defining processing of the expression according to a proposed embodiment (e.g. as described above). Subsequently, a value of the state flag may be determined and, based on the determined value of the state flag, either the expression or the modified version of the expression may be processed.

By way of example, such embodiments may further include determining a requestor user account requesting processing of the expression, the requestor user account having an associated service authorization configured to authorize the enterprise workspace application to access a service using the requestor user account. Processing the modified version of the expression may then comprise processing the modified version of the account using the service authorization associated with the requestor user account. This can enable an expression to be processed and presented as being done so by the requestor, thus preventing an authorization of another user (e.g. the owner) from being inherited.

Proposed concepts may thus provide a method of processing an expression of an enterprise workspace application, the expression being associated with a state flag and a modified version of the expression, wherein the method comprises: determining a value of the state flag; and based on the determined value of the state flag, processing either the expression or the modified version of the expression.

For example, processing either the expression or the modified version of the expression may comprise: responsive to determining the value of the state flag is a first value, processing the expression; and responsive to determining the value of the state flag is a second, different value, processing the modified version of the expression. The state flag may therefore be used to determine how an expression is processed. For instance, embodiments may be configured so that state flag must be set to a predetermined value (e.g. 'true') in order for that expression to employ/inherit a user's authorization(s).

By way of further example, the expression may associated with an owner. The owner may have an identifier of a first user account of the enterprise workspace, wherein the first user account has an associated service authorization configured to authorize the enterprise workspace application to access a service using the first user account. The state flag may then be used to control if processing of the expression employs/inherits service authorization associated with the first user account The value of the flag may be set by calling (e.g. including ahead of, or as part of, the expression) a predetermined function (such as a "asowner( )" function).

When the expression is associated with a trusted user (the trusted user comprising an identifier of a second user account of the enterprise workspace), a proposed embodiment of processing an expression may include determining if a requestor user account requesting processing of the expression is the second user account. If it is determined that the requestor user account requesting processing of the expression is the second user account, the modified version of the account may be processed using the service authorization associated with the first user account. In this way, when requested by particular (trusted) use that is not the owner of the expression, the expression can be processed as if such processing was requested by the owner of the expression. Expression processing (e.g. triggering of the expression) can therefore be delegated from to one or more other users that are trusted (i.e. permitted to act on behalf of the owner). Further, untrusted users (i.e. users that have not been associated with the expression) may be prevented from causing the expression (or a part of the expression) to be processed as such processing was requested by the owner.

By way of example, in embodiments, the service may comprise a service of a network service platform accessible via the Internet. The service may therefore comprise a third party service (such as an email service) that is external to the provider/distributor of the enterprise workspace. Embodiments may therefore control the ability of a trigger expression to use authorizations of a user (e.g. owner) when processed. For instance, embodiments may prevent a trigger expression being processed and made to appear as if triggered by a particular user even though it wasn't.

Figure 1:
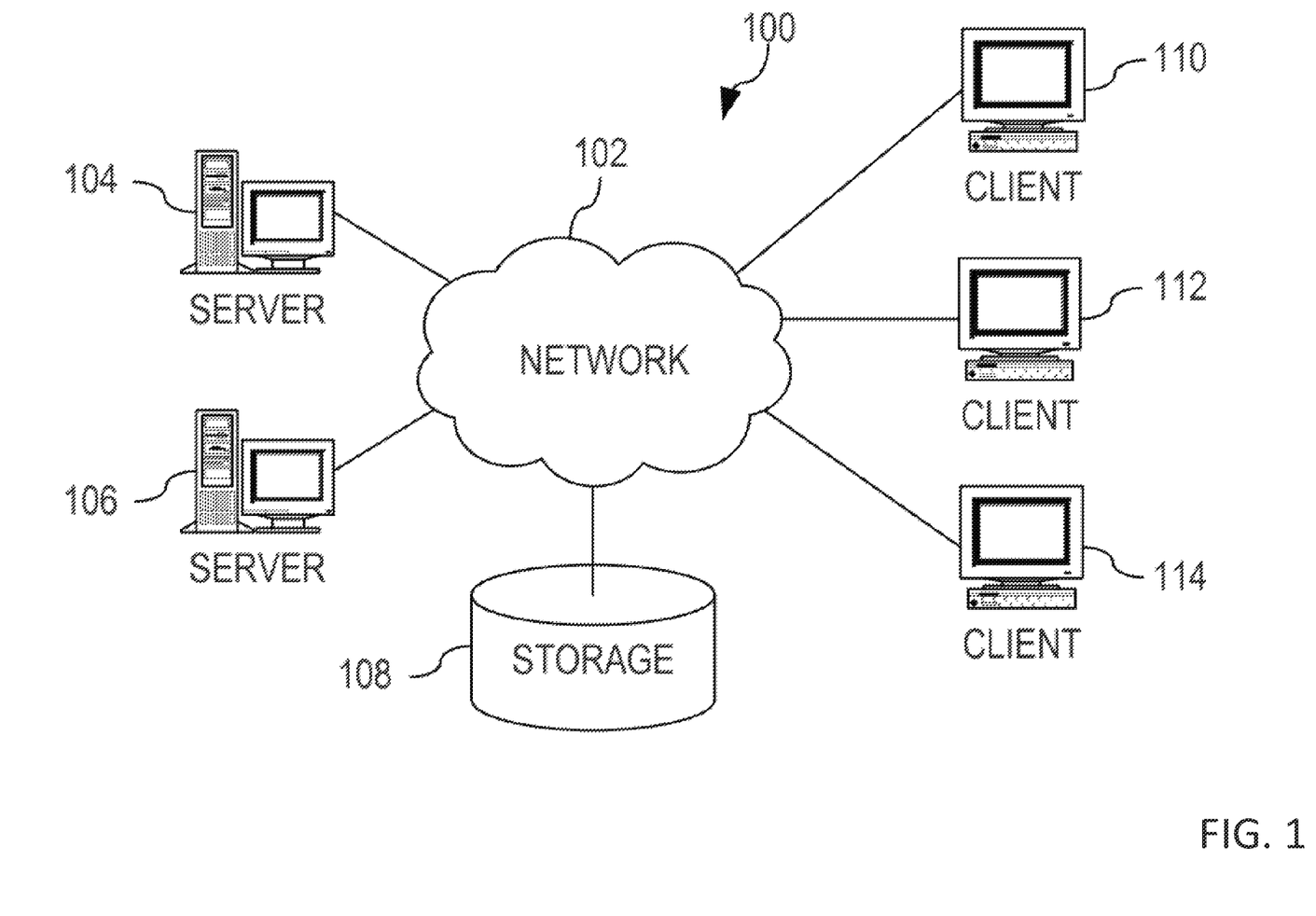
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
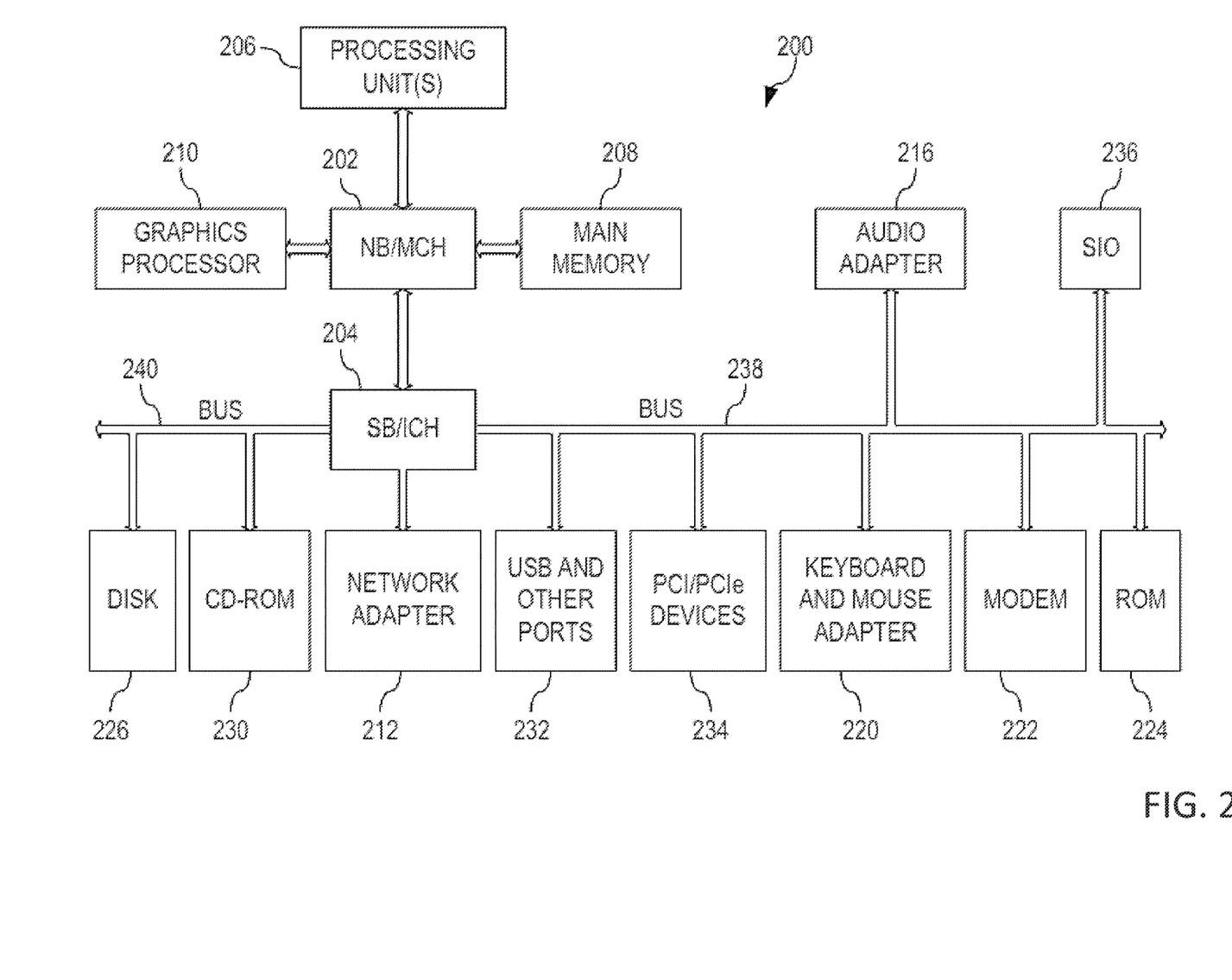
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed. IBM, eServer and AIX are trademarks of International Business Machines Corporation in the United States and/or other countries. Linux is a registered trademark of Linus Torvalds in the United States, other countries, or both.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method and system for controlling the processing of an expression of an enterprise workspace application. Such embodiments may associate the expression with a modified version of the expression (e.g. that is configured to be user-specific). Then, by employing a state flag associated with the expression, the state flag can be used define whether processing of the expression is to be based on the modified version of the expression. In this way, the state flag may be used to call modified version of the expression for processing.

Figure 3:
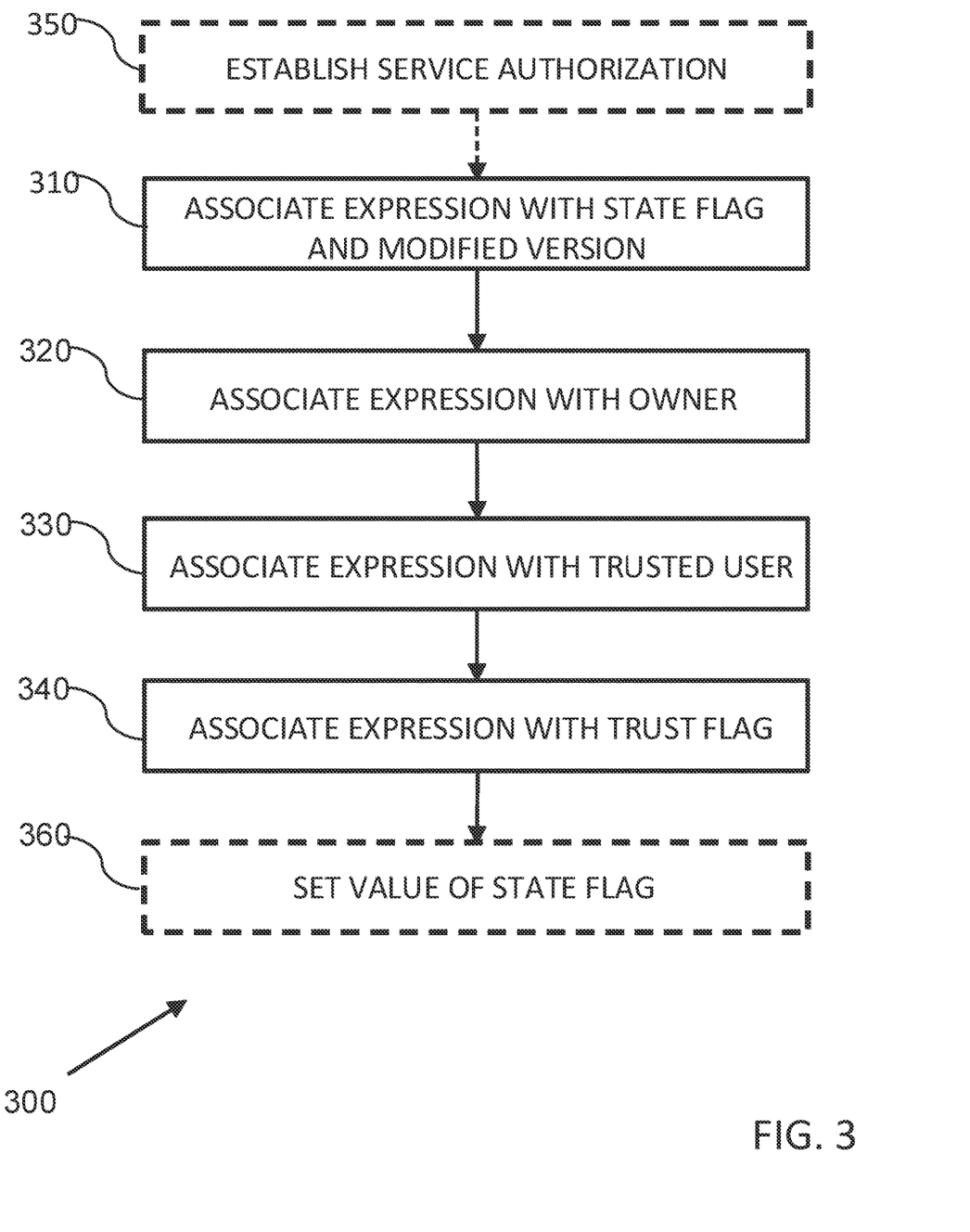
FIG. 3 is a simplified flow diagram of an exemplary embodiment of a computer-implemented method for defining the processing of an expression of an enterprise workspace user account.

Referring now to FIG. 3, an exemplary embodiment of a method 300 for defining the processing of an expression of an enterprise workspace user account will be described. In this example, the service is a service of a network service platform accessible via the Internet, and the enterprise workspace is a workspace provided/distributed by a company to its employees.

Step 310 comprises associating the expression with: a state flag; and a modified version of the expression. Here, the state flag is configured to define whether processing of the expression is to be based on the modified version of the expression. More specifically, in this example, the state flag is a Boolean-valued flag that can have either of two values, e.g. 'True' or 'False'. Also, the modified version of the expression differs from the expression such that its content is user-dependent. For example, the modified expression may comprises content, data or text relating a user, thus resulting in the modified expression being user-specific when processed.

In step 320, the expression is associated with an owner. The owner comprises an identifier of a first user account of the enterprise workspace. Also, the first user account has an associated service authorization configured to authorize the enterprise workspace application to access a service using the user account. Accordingly, in this example, the service authorization of the first user account has been previously established and is configured to authorize the enterprise workspace to access data of the service for the first user account.

In step 330, the expression is associated with a trusted user. The trusted user is defined based on an indication provided by the owner, and the trusted user comprises an identifier of a second user account of the enterprise workspace (which is different from the first user account). Thus, step 330 enables the owner of the expression to identify another user that is deemed to be trusted (e.g. authorized to act on behalf of the owner). In this way, the owner declares trust in another user, so that expression is configured to be permitted to be created by that other user and but processed (e.g. executed) with the identity of the owner.

In step 340, the expression is associated with a trust flag. The trust flag comprises a Boolean value that is indicates whether processing of the modified version of the expression is permitted or not permitted. In this example, the value of the trust flag is set based on an indication (e.g. user input) provided by the owner. This enables the expression to be defined as trusted or not. Consequently, where another user has provided the expression, the expression may be identified (e.g. by the owner) as trusted or untrusted. Untrusted expressions (i.e. expressions that have not been identified as trusted) may, for instance, then be prevented from being processed and/or only permitted to be executed under the default authority (i.e. only 'unauthenticated') thus preventing activity against a service that requires authentication.

It will be appreciated that the completion of the method 300 for defining the processing of an expression provides supplementary or additional information that is associated with the expression, and such supplementary/additional information may be used to control how the expression is processed.

Although in the above example embodiment the service authorization has been previously established, it is to be understood that other embodiments may comprise the preceding step (350) of establishing a service authorization for the first user account, the service authorization being configured to authorize the enterprise workspace to access data of the service for the first user account. Simply by way of illustration, this step is depicted in FIG. 3 using dashed lines.

For example, the step 350 of establishing a service authorization for the first user account may comprise: defining an 'oauth profile' for the first user account; and based on the oauth profile, defining a service authorization that is configured to authorize the enterprise workspace to access data of the service for the first user account. Oath profiles are widely known and used in conventional authorization concepts and procedures. Accordingly, detailed description of such oauth profiles and their usage is omitted herein.

Also, it is to be understood that other embodiments may comprise the step (360) of setting a value of the state flag by calling a predetermined function. Simply by way of illustration, this step is depicted in FIG. 3 using dashed lines. For example, a state flag may be set to true by calling a function, thus making it easy for a user to easily define/control how the expression (or part of the expression) is to be processed.

Figure 4:
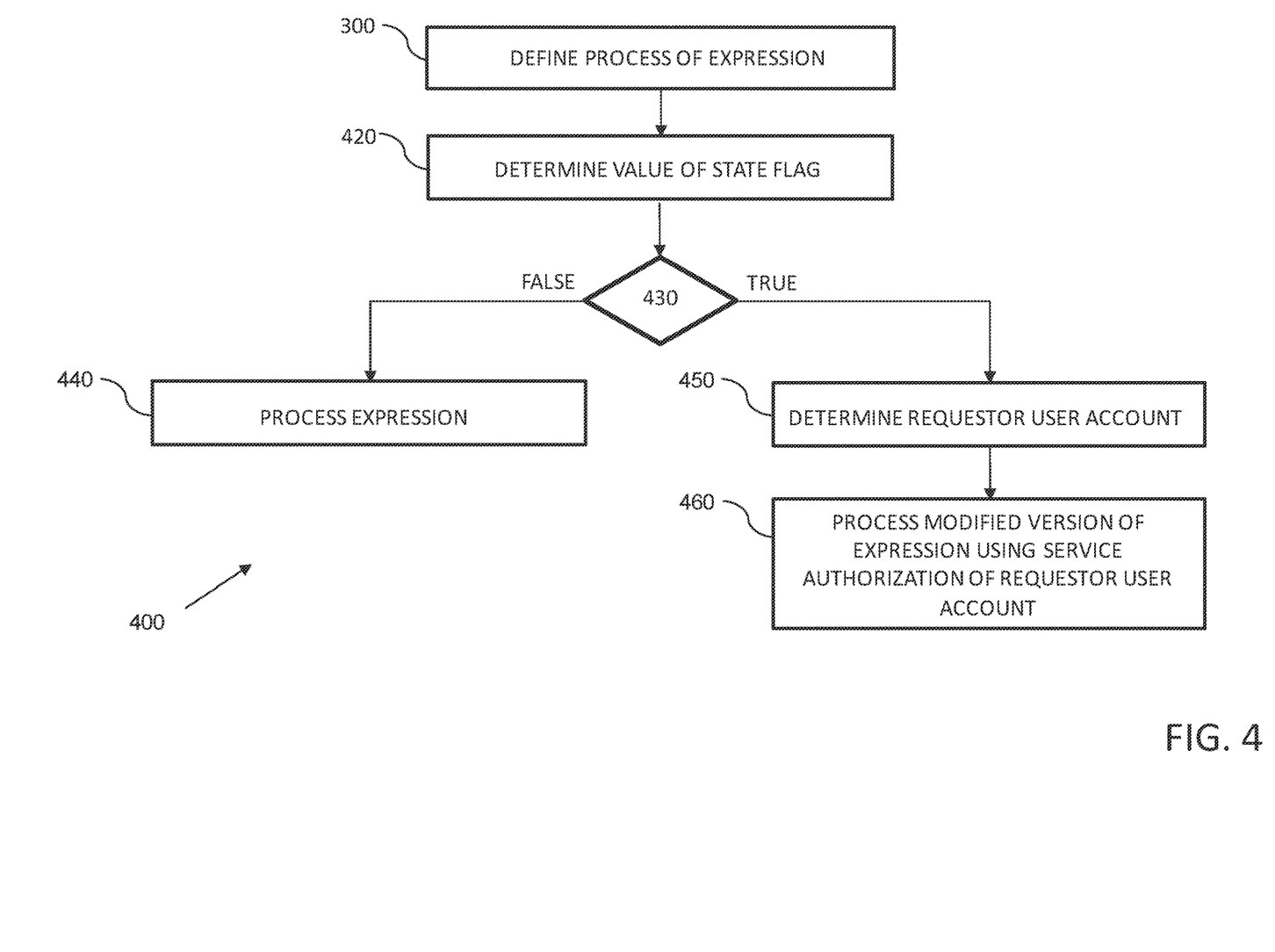
FIG. 4 is a simplified flow diagram of an exemplary embodiment of a computer-implemented method a computer-implemented method of processing an expression of enterprise workspace application.

Referring now to FIG. 4, an exemplary embodiment of a method 400 of processing an expression of enterprise workspace application will be described.

In this example, the expression is defined according to the embodiment of FIG. 3. Thus, the first step of the method 400 is to complete the method 300 for defining the processing of an expression. As mentioned above, completion of the method 300 for defining the processing of an expression provides supplementary or additional information that is associated with the expression, and such supplementary/additional information may then be used to control how the expression is processed.

The method then proceeds to step 420 of determining a value of the state flag associated with the expression. In this example, the state flag is a Boolean-valued flag that can have either of two values, e.g. 'True' or 'False'. Thus, in step 420, it is determined if the value of the state flag is 'True' of 'False'.

Step 430 is a decision step which, based on the determined value of the state flag, control whether the method proceeds to step 440 or to step 450.

If the determined value of the state flag is 'False', step 430 controls the method to proceed to step 440. In step 440, the expression is processed (e.g. in a conventional manner).

Conversely, if the determined value of the state flag is 'True', step 430 controls the method to proceed to step 450. Step 450 comprises determining a requestor user account that is requesting processing of the expression, the requestor user account having an associated service authorization configured to authorize the enterprise workspace application to access a service using the requestor user account. The method then proceeds to step 460 which comprises processing the modified version of the expression using the service authorization associated with the requestor user account. This ensures that the modified expression is processed and presented as being done so by the requestor, thus preventing the authorization(s) of another user (e.g. the owner) from being inherited.

To aid further understanding and appreciation of the proposed concept(s), exemplary implementations will now be described. Such implementations are simply provided to demonstrate process steps and algorithms that may be employed, and it should be understood that other implementations are not limited to such process steps and algorithms only. Indeed, the skilled person will appreciate the other process steps and/algorithms may be employed to undertake and/or provide similar aspects of the proposed concept(s).

We begin description of an exemplary implementation by considering that expressions for use in an enterprise workspace are assigned (i.e. associated with) a unique, modified version of the expression, an owner and an "asme" state flag. Here, it is defined that the 'asme' state flag must be set to 'True' in order for the associated expression to employ/inherit a user's authorization. By way of example, the value of the asme state flag is set to 'True' by calling the an asme( ) function. In this way, an expression and an associated modified version of the expression may be provided as follows:

= say("Hello", "The application is saying this")

= asme(); say("Hello", "You are saying this")

In the first instance above, because the asme( ) is not employed, the expression is provided in its first/original form that does not use the users authorizations. It therefore simply functions with the authority permitted for the workspace application only.

In the second instance above, because the asme( ) is employed, the modified version of the expression is provide and inherits/uses authorizations associated with the user (e.g. the user that created/triggered the expression).

Let us now consider an example where a malicious user defines the trigger (provided in the background section above) which is designed to cause a user to inadvertently email a nasty message to his/her boss every time the user types an expression into the workspace containing the word "help", namely the trigger:

=trigger nastytrigger contains(message, "help")!!! email ("Boss", "You are a bad boss").

According to proposed embodiments, this will back-fire on the malicious user, because proposed embodiments assign the creator's/requestor's identity to triggers. In this way, the expression is processed and presented as being done so by the requestor (e.g. the malicious user), thus preventing an authorization of another user (e.g. the owner) from being inherited.

But let us now also consider the following example which is designed to cause a user to inadvertently email a nasty message to his/her boss every time the help( ) function is called, namely the trigger:

=function help( ) asme( );email("Boss", "You're a bad boss!");"You requested help"

Again, according to proposed embodiments, this will also back-fire on the malicious user, because (according to proposed concept(s)), any function definition that includes an asme( ) call will be controlled to be processed using the identity of the user that created it. In other words, processing the modified version of the expression comprises processing the modified version of the account using the service authorization associated with the requestor user account.

Some enterprise workspace applications support variables that are assigned expressions. The asme( ) and nasme( ) functions are thus made unavailable to variable expressions.

By way of further example, it is noted that a user can declare trust in another user, and/or in a specific function or trigger defined by another user. By way of example, this may be achieved using the following:

= trustperson ("Joe Bloggs")

= trustfunction ("help")

= trusttrigger ("helptrigger")

Here, it will be appreciated that trust functions will only be available for direct execution by a user, and not executable via a trigger.

Where a user has been declared as trusted (e.g. identified as trusted by an owner of the expression), any triggers or functions either created by the trusted person will execute with the identity of the user allowing asme( ) to authorize. A function or a trigger within a workspace has the creator (e.g. owner) recorded, and is then blocked from being overridden by any other user when such trusts are defined.

Let us consider an example wherein a user 'Joe' creates a new function "joesdandyfunction" that uses asme( ) to set the state flag to True, and another user 'Tom' declares that he/she trusts the function. If a further user (e.g. 'Fred') attempts to create a new function named "joesdandyfunction", he is disallowed. Further, if Joe attempts to modify his named function "joesdandyfunction", he is allowed because he is the creator/owner of the function. Responsive to this, Tom may be sent a notification advising that a trusted function was modified.

If Tom explicitly trusts Joe as a person, he may be free to modify or create triggers or functions.

In the context of an enterprise workspace, it may be possible for a user to declare trust in the "Workspace Owner" or "All Members". In the former case, any triggers or functions created by the space owner are trusted and, in the latter case, every trigger and function in the space is trusted.

The execution flow of any expression or subexpression (a subexpression being an expression declared in a defined function) by a workspace application is typically aware of the caller identity and the creator identity. When the asme( ) function is called, the expression (or subexpression) state is set to act "asme" and authorization and trust are applied appropriately to select the user under which that expression or subexpression is acting.

It will be understood that although some exemplary trust scenarios have been detailed above, these can be extended to trust "no one" or to disallow the activation of any trigger or function unless a trust is in place regardless of the "asme" state.

Figure 5:
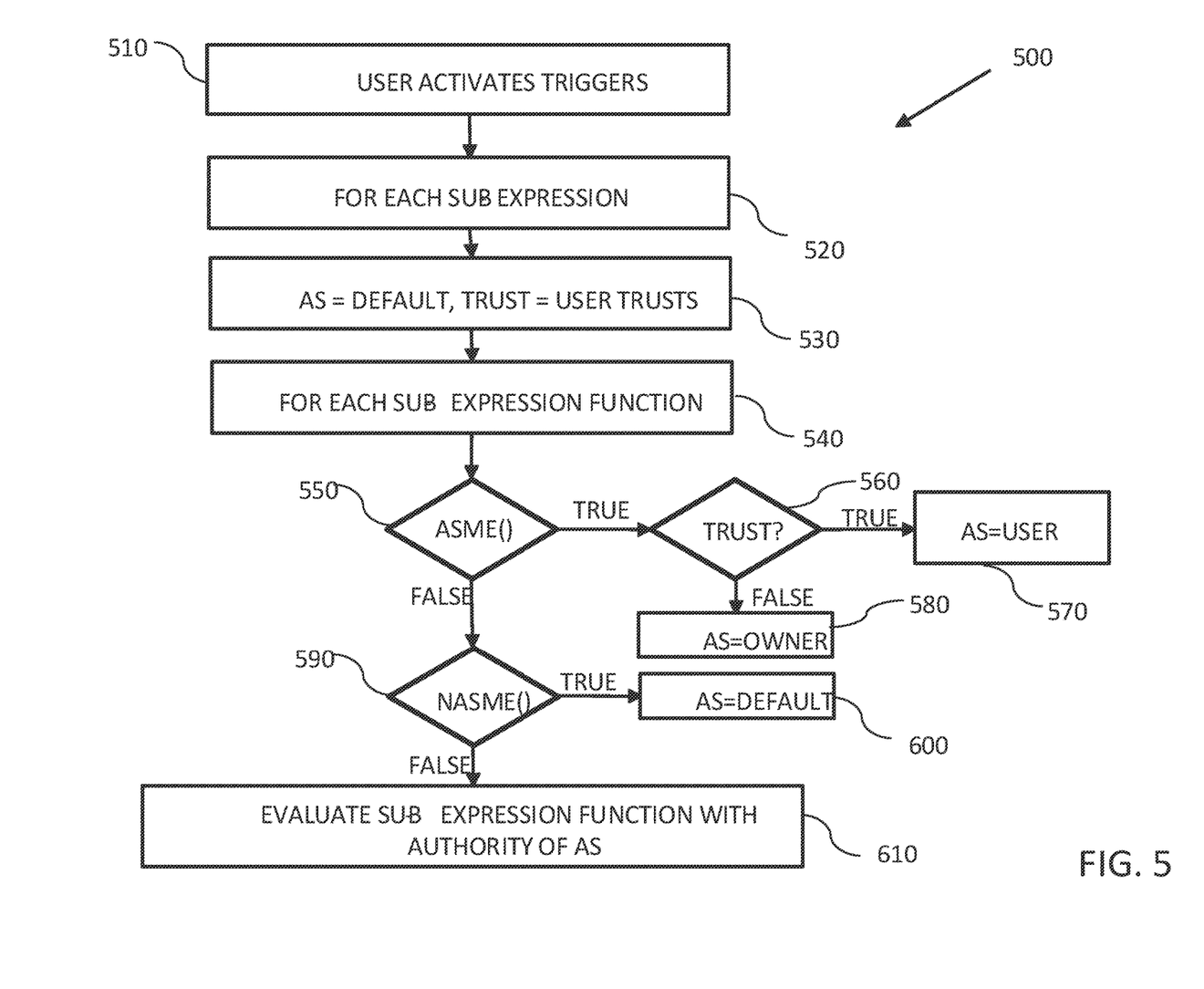
FIG. 5 is a simplified flow diagram of an exemplary execution flow according to an embodiment.

By way of further example, FIG. 5 depicts a flow diagram of an exemplary execution flow 500 according to an embodiment. For such an example, the owner creates an expression and also creates a trigger.

In step 510, a user activates triggers and the method then proceeds to step 520. Step 520 comprises executing a (main) loop for each sub-expression of the expression.

In the main loop, the method proceeds to step 530, wherein 'As' is set to have a default authorization, and wherein 'Trust' flag is set to indicate if the user trusts the owner or expression. Next, in step 540, a (sub) loop is executed for each sub-expression function.

In this (sub) loop, it is determined in step 550 whether the Asme( ) function is set to true or false.

If the Asme( ) function is set to true, the method proceeds to step 560, wherein the value of the 'Trust' flag is determined. If, in step 560, the value of the 'Trust' flag is determined to be true, the value of As is set as User in step

570. Conversely, if, in step 560, the value of the 'Trust' flag is determined to be false, the value of As is set as Owner in step 580.

If the Asme( ) function is set to false, the method proceeds to step 590, wherein it is determined whether the Nasme( ) function is set to true or false. If, in step 590, the value of the Nasme( ) function is determined to be true, the value of As is set as Default in step 600. Conversely, if, in step 590, the Nasme( ) function is determined to be false, the sub-expression function is evaluated function with authority of 'As'.

Figure 6:
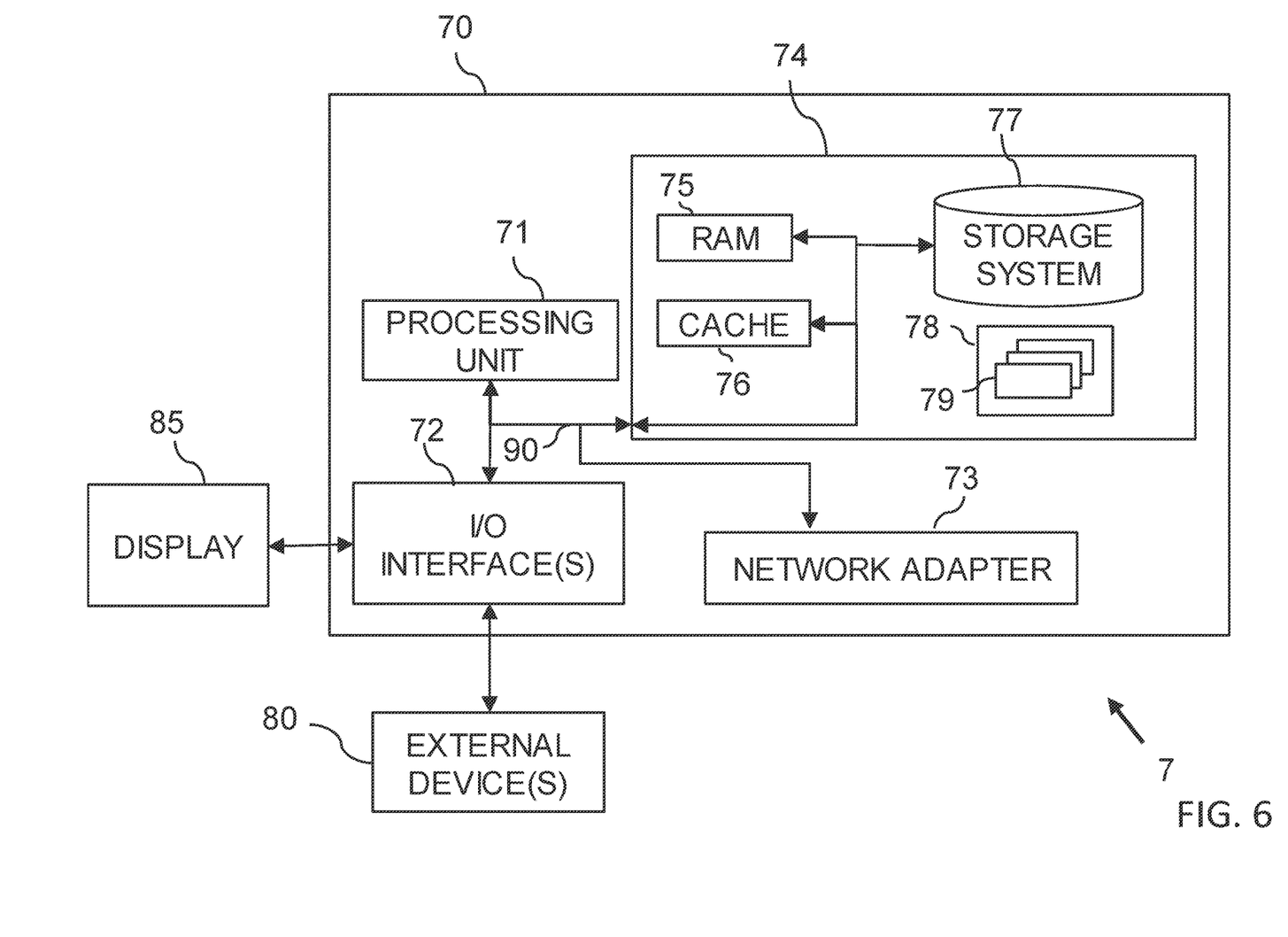
FIG. 6 illustrates a system according to another embodiment.

Embodiments may comprise a computer system 70, which may form part of a networked system 7 illustrated in FIG. 6. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein. #

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for defining processing of an expression of an enterprise workspace application, the method comprising:
   associating the expression with: a state flag; and a modified version of the expression, wherein the state flag is configured to define whether processing of at least part of the expression is to be based on the modified version of the expression; and
   associating the expression with an owner, wherein the owner comprises an identifier of a first user account of the enterprise workspace, the first user account having an associated service authorization configured to authorize the enterprise workspace application to access a service using the user account.

2. The method of claim 1, comprising:
   establishing a service authorization for the first user account.

3. The method of claim 2, wherein establishing a service authorization for the first user account comprises:
   defining an oauth profile for the first user account; and
   based on the oauth profile, defining a service authorization that is configured to authorize the enterprise workspace application to access the service using the first user account.

4. The method of claim 1, further comprising:
   associating the expression with a trusted user, wherein the trusted user is defined based on an indication provided by the owner, and wherein the trusted user comprises an identifier of a second user account of the enterprise workspace.

5. The method of claim 1, further comprising:
   associating the expression with a trust flag, wherein the trust flag is configured to define whether processing of the modified version of the expression is permitted or not permitted; and
   setting a value of the trust flag based on an indication provided by the owner.

6. The method of claim 1, further comprising:
setting a value of the state flag by calling a predetermined function.

7. The method of claim 1, further comprising:
determining a value of the state flag; and
based on the determined value of the state flag, processing either the expression or the modified version of the expression.

8. The method of claim 7, further comprising:
determining a requestor user account requesting processing of the expression, the requestor user account having an associated service authorization configured to authorize the enterprise workspace application to access a service using the requestor user account,
and wherein processing the modified version of the expression comprises processing the modified version of the account using the service authorization associated with the requestor user account.

9. A computer program product comprising a computer readable storage medium having program instructions embodied therewith, the program instructions executable by a processing unit to cause the processing unit to perform, when run on a computer network, a method for defining processing of an expression of an enterprise workspace application comprising the steps of:
associating the expression with: a state flag; and a modified version of the expression, wherein the state flag is configured to define whether processing of at least part of the expression is to be based on the modified version of the expression; and
associating the expression with an owner, wherein the owner comprises an identifier of a first user account of the enterprise workspace, the first user account having an associated service authorization configured to authorize the enterprise workspace application to access a service using the user account.

10. The computer program product of claim 9, comprising:
establishing a service authorization for the first user account.

11. The computer program product of claim 10, wherein establishing a service authorization for the first user account comprises:
defining an oauth profile for the first user account; and
based on the oauth profile, defining a service authorization that is configured to authorize the enterprise workspace application to access the service using the first user account.

12. The computer program product of claim 9, further comprising:
associating the expression with a trusted user, wherein the trusted user is defined based on an indication provided by the owner, and wherein the trusted user comprises an identifier of a second user account of the enterprise workspace.

13. The computer program product of claim 9, further comprising:
associating the expression with a trust flag, wherein the trust flag is configured to define whether processing of the modified version of the expression is permitted or not permitted; and
setting a value of the trust flag based on an indication provided by the owner.

14. The computer program product of claim 9, further comprising:
setting a value of the state flag by calling a predetermined function.

15. The computer program product of claim 9, further comprising:
determining a value of the state flag; and
based on the determined value of the state flag, processing either the expression or the modified version of the expression.

16. The computer program product of claim 15, further comprising:
determining a requestor user account requesting processing of the expression, the requestor user account having an associated service authorization configured to authorize the enterprise workspace application to access a service using the requestor user account,
and wherein processing the modified version of the expression comprises processing the modified version of the account using the service authorization associated with the requestor user account.

17. A system for processing an expression of an enterprise workspace application, the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
associating the expression with: a state flag; and a modified version of the expression, wherein the state flag is configured to define whether processing of at least part of the expression is to be based on the modified version of the expression; and
associating the expression with an owner, wherein the owner comprises an identifier of a first user account of the enterprise workspace, the first user account having an associated service authorization configured to authorize the enterprise workspace application to access a service using the user account.

* * * * *